Nov. 19, 1929.  L. K. BRAREN  1,736,647
INJECTION OF LIQUID FUEL IN INTERNAL COMBUSTION ENGINES
Filed Dec. 14, 1925     6 Sheets-Sheet 5
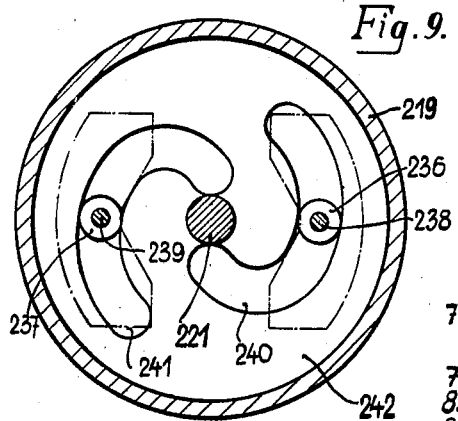
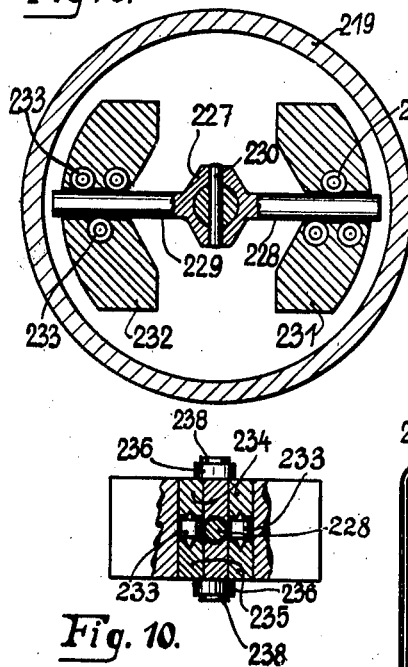
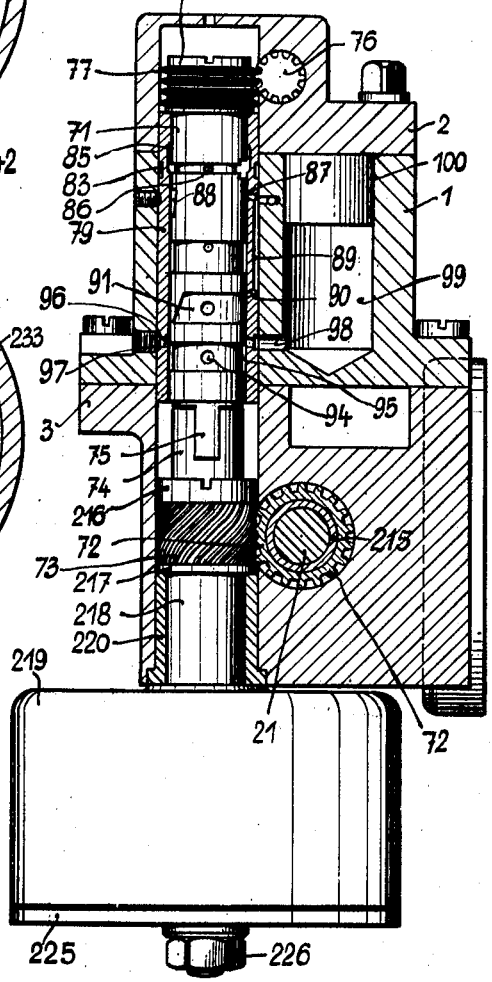
Inventor
Lorenz Konrad Braren
By Edward N. Cumpton
his Attorney

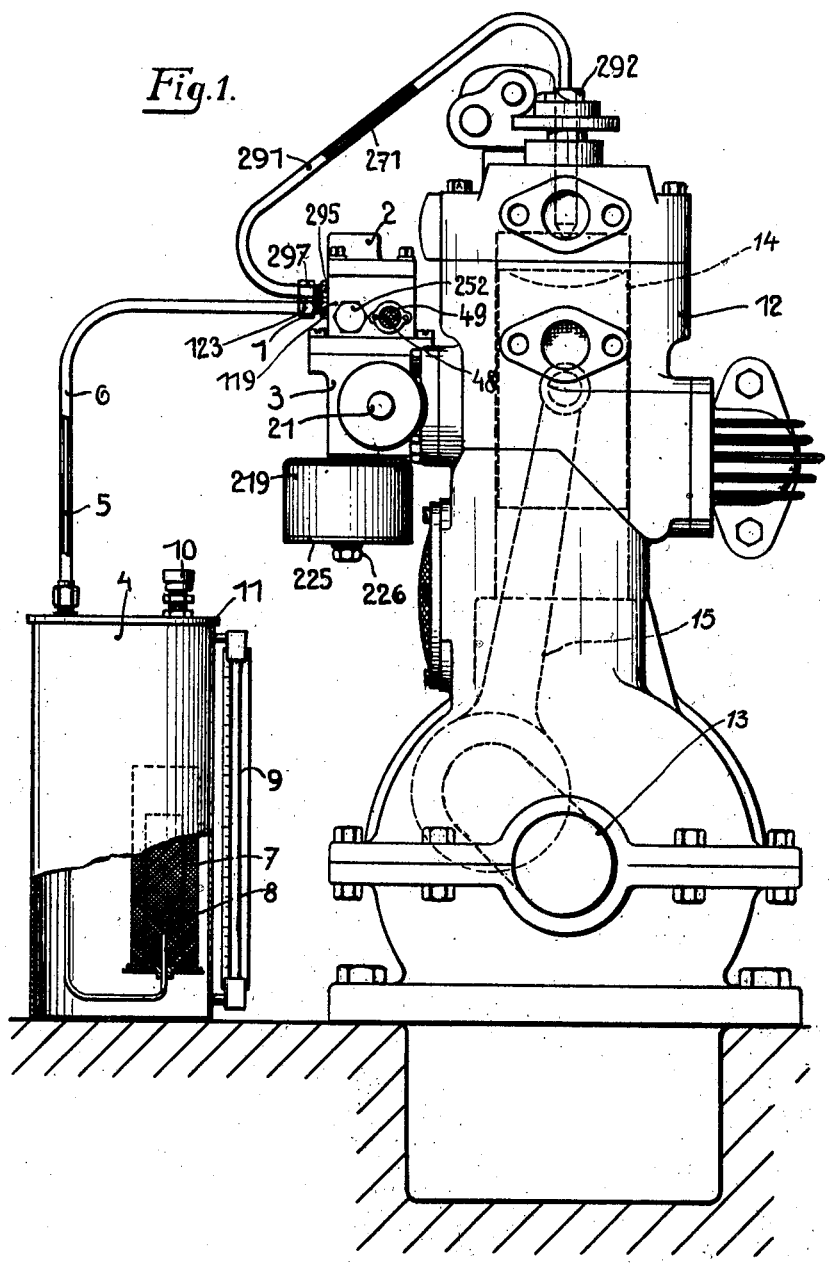

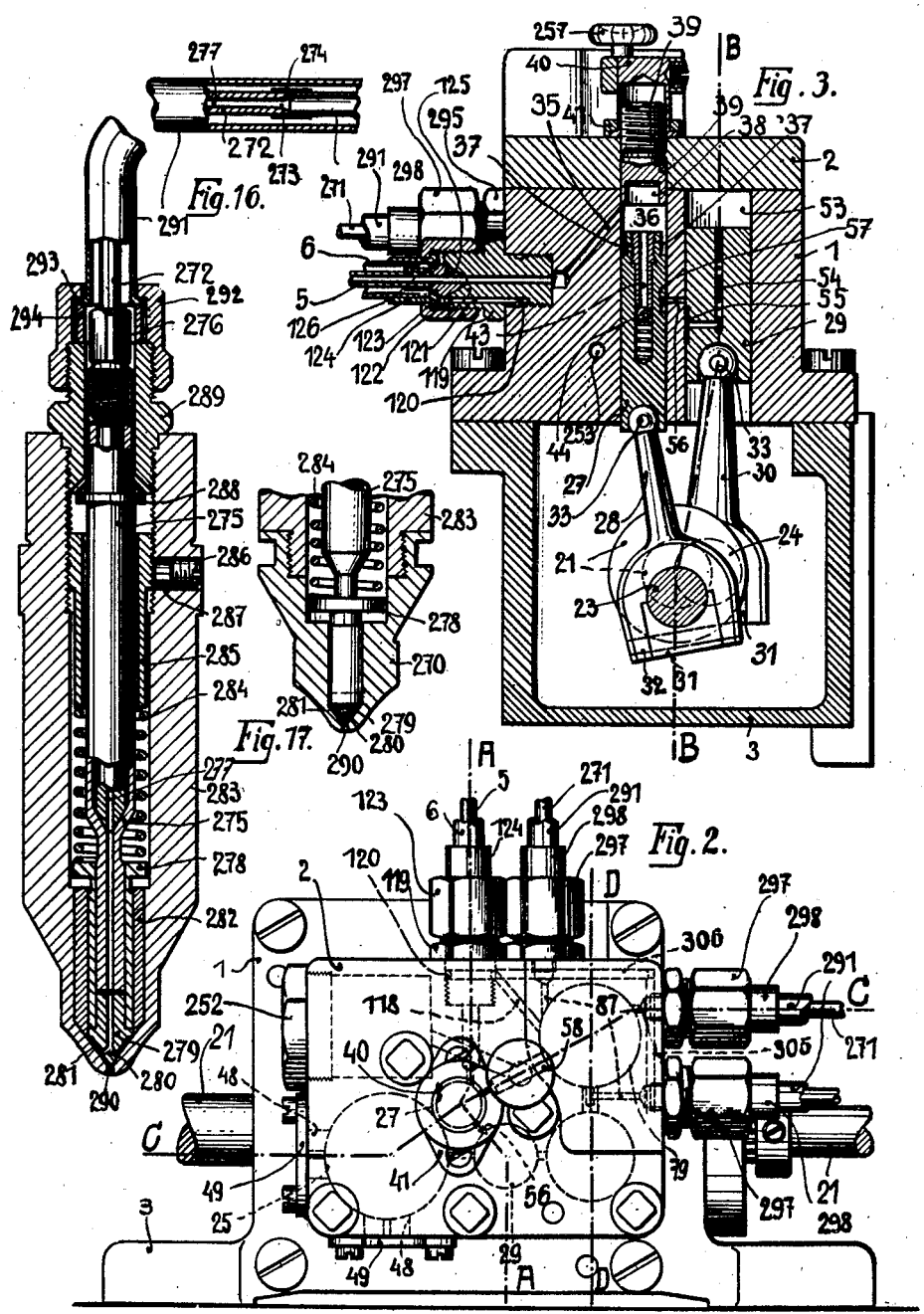

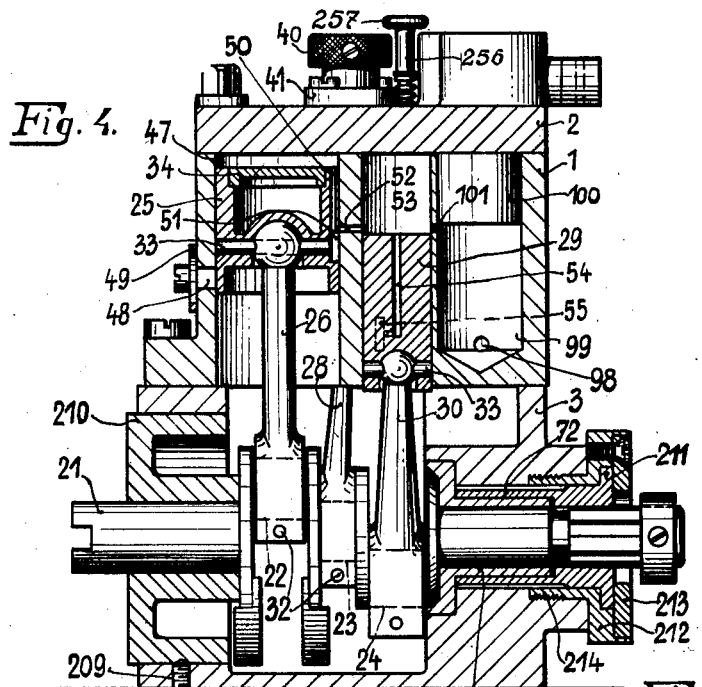

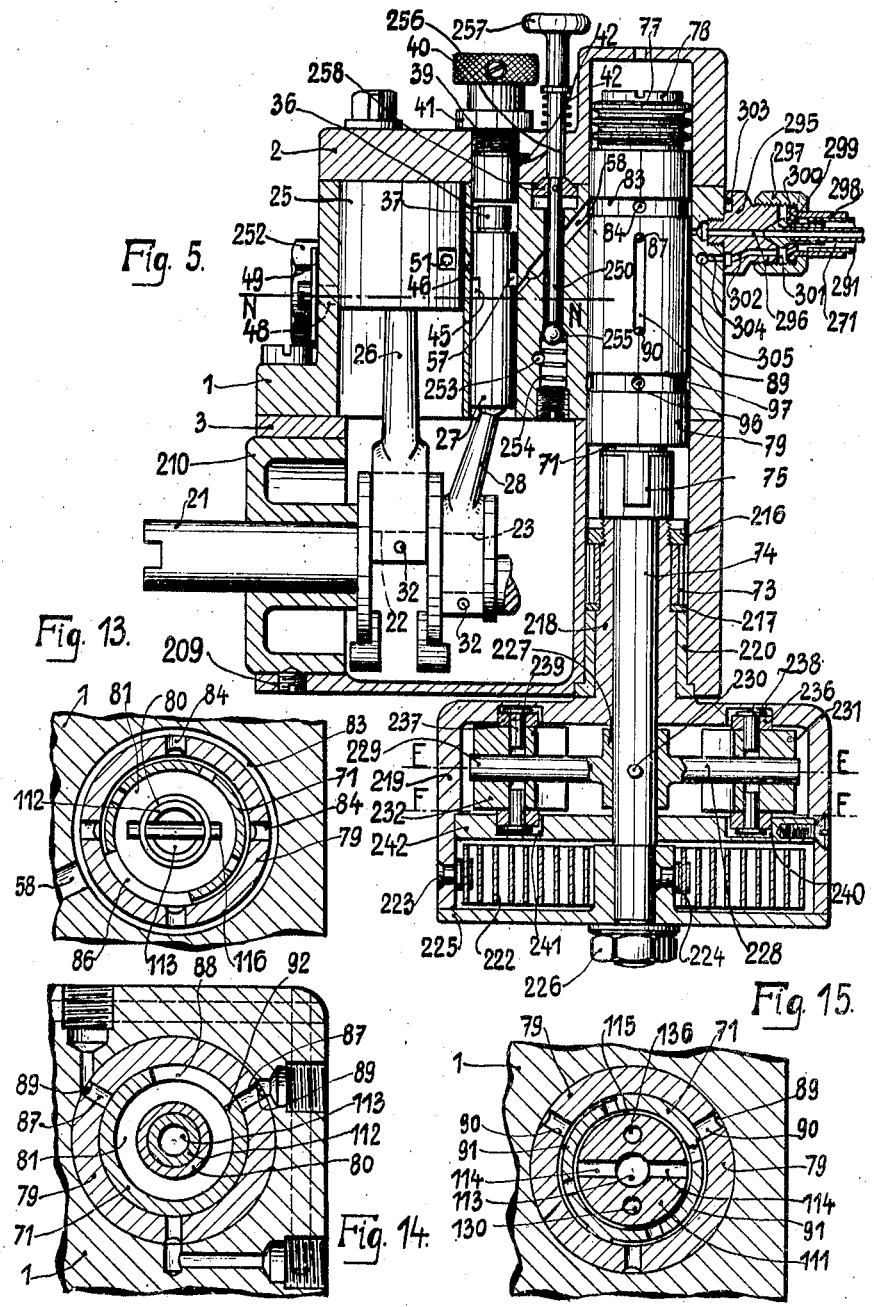

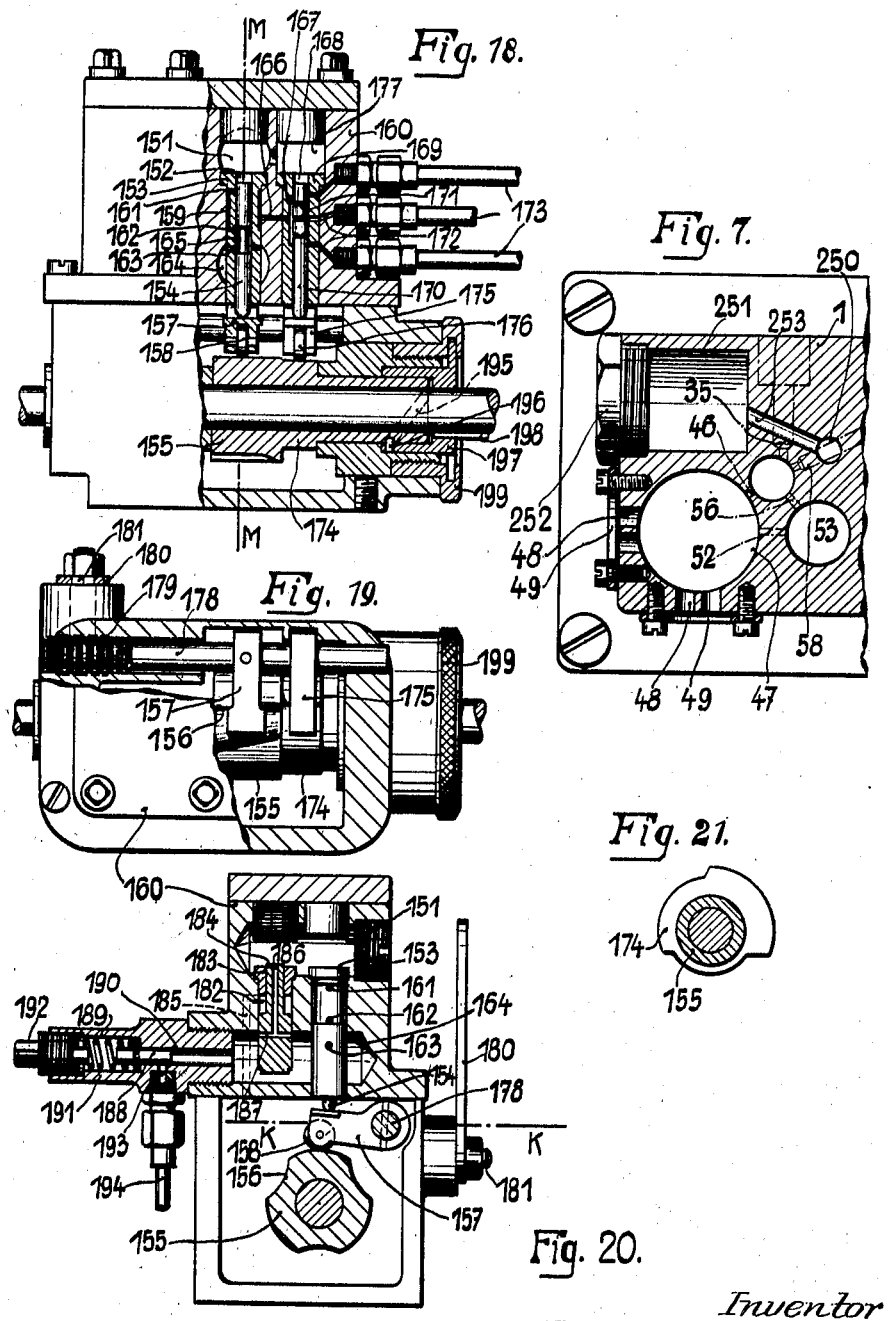

Patented Nov. 19, 1929

1,736,647

UNITED STATES PATENT OFFICE

LORENZ KONRAD BRAREN, OF MUNICH, GERMANY

INJECTION OF LIQUID FUEL IN INTERNAL-COMBUSTION ENGINES

Application filed December 14, 1925, Serial No. 75,452, and in Germany January 14, 1925.

This invention relates to the injection of liquid fuel into the cylinders of internal combustion engines of the Diesel or semi-Diesel type where the fuel is injected into the combustion chamber at or about the end of the compression period and the object of the invention is to provide improved means for accomplishing the desired results in an efficient and economical manner.

A further object of the invention is to provide improved means by which a mixture of liquid fuel and air or another gas or vapor is compressed and injected into the combustion chamber, and in which the compression of the mixture is carried beyond the pressure in said chamber so that when injecting the mixture into the chamber the minute air bubbles contained in the mixture will expand and cause effective disruption of the thin skins and small particles of liquid fuel surrounding them, the expansion of the enclosed air being further enhanced by the heat of the compressed air in the combustion chamber.

A further object is to provide improved apparatus in which the mixing process is influenced by a number of different factors which may be applied singly or in various combinations, the fuel being injected under pressure into the air and thus finely divided, the liquid fuel and air being mixed and compressed in two or more stages and preferably kept in constant motion.

A further object of the invention is to provide an improved method of forming or preparing the combustible charges for explosive engines of the Diesel or semi-Diesel type.

To these and other ends the invention resides in certain improvements and combination of parts, all as will be hereinafter more fully described, the novel features being pointed out in the claims at the end of the specification.

Fig. 1 shows the general arrangement of the mechanism on an internal combustion motor;

Fig. 2 is a top view of the fuel and mixing pump;

Fig. 3 is a cross section through the pump according to the line A—A on Figure 2;

Fig. 4 is a longitudinal section through the pump according to the line B—B on Figure 3;

Fig. 5 is a longitudinal section through the pump according to the line C—C on Figure 2.

Fig. 6 is a cross section through the pump according to the line D—D on Figure 2.

Fig. 7 is a partial section through the pump according to the line N—N on Figure 5.

Fig. 8 is a section through the phase regulator according to the line E—E on Figure 5.

Fig. 9 is a section through the phase regulator according to the line F—F on Figure 5.

Fig. 10 shows the arrangement of the guiding rollers for the governor weights, partially in section.

Fig. 11 shows the rotating distributor in section according to the Figures 5 and 6 on an enlarged scale.

Fig. 12 is a development of the circumference of the distributor on the same scale as Figure 11.

Fig. 13 is a cross section through the distributor according to the line G—G on Figure 11.

Fig. 14 is a section through the distributor according to the line H—H on Figure 11.

Fig. 15 is a section through the distributor according to the line I—I on Figure 11.

Fig. 16 shows the construction of the fuel line and the injection valve in a longitudinal section on an enlarged scale.

Fig. 17 shows a different construction for the lower part of the injection valve.

Fig. 18 is a pump with a reciprocating quantity regulator and distributor.

Fig. 19 is a horizontal section according to the line K—K on Figure 20.

Fig. 20 is a cross section through the distributor according to the line M—M on Figure 18.

Fig. 21 shows the construction of the cam for a distributor as shown on the Figures 18 to 20.

The following is an outline of the principles and objects of the invention, describing in general the method and means for carrying out the principles to obtain the results desired.

The quantity of fuel injected into the combustion chamber may be regulated in different ways. Either the necessary quantity only is mixed and injected into the chamber or a larger quantity as needed is prepared and stored in a pressure chamber. The fuel mixture may then be apportioned in the desired quantity by a positively operated valve opening to the combustion chamber, or a regulating mechanism connected to the mixing pump permits a certain amount of mixture to pass into the fuel line. The increase of pressure in the fuel line caused thereby lifts a closing vlave, and according to the adjustment of the regulating mechanism a larger or smaller quantity of fuel mixture is injected into the combustion chamber.

This method of regulation by taking the needed quantity of mixture out of a chamber under high pressure has the advantage that the amount of fuel introduced into the combustion chamber is a function of the rotative speed of the motor. This is of considerable advantage especially for locomotive purposes, because for each adjustment of the quantity regulating means a variation in the load on the motor is followed automatically by a change in the turning moment (or in the quantity of fuel injected) together with a corresponding change in the rotative speed. With a higher load on the motor the speed decreases and the fuel injected increases correspondingly until a state of equilibrium has been reached. A lesser load on the contrary causes an increase of the speed of the motor whereby the amount of fuel for each injection is automatically reduced.

In case the regulating mechanism is built together with the mixing pump, distributing means are provided for several combustion chambers for distributing the fuel to the various cylinders in order to have a single mixing pump and only one regulating mechanism serve for a number of cylinders.

Instead of the quantity the quality of the mixture may be changed or both these methods of regulation may be combined. For regulating the quality of the mixture a constant amount of air, or gas is mixed with a variable quantity of liquid fuel. A mixture of 1000 parts by volume of air or gas reduced to atmospheric pressure and surrounding temperature and about 4 to 60 parts by volume of liquid fuel has been proven in practical experience to possess in these limits special advantages. When regulating the quality of the mixture in the limits given above and changing at the same time also the quantity an extremely fine graduation of the fuel is attained even for a large range of speeds.

With a greater admixture of liquid fuel to air than 60 parts in 1000 the disrupting effect of the enclosed air bubbles will not be satisfactory because the mixture is injected into the highly compressed air of the combustion chamber.

With a lesser admixture of liquid fuel than 4 parts in 1000 it becomes difficult to compress the larger quantity of air on account of the high temperature due to the reduced cooling effect of the smaller quantity of liquid.

A mixture in exact proportions is attained by using pistons for measuring both air and fuel. For regulating the quantity of liquid fuel the latter is only delivered during a variable part of the stroke of the fuel piston into the air cylinder, while the fuel during the rest of the stroke is pushed back into the suction line.

To regulate the quantity of the mixture there is either employed a regulating mechanism controlled by a cam with a changeable cam shape or there is used a rotating sleeve, which makes communication during each revolution between the pressure chamber and the line conducting the fuel mixture towards the cylinder. The angular period of communication depends on the axial position of the sleeve. A rotating sleeve in contrast to a reciprocating member can be used at any speed without causing accelerating forces. A sleeve can be used further also as a distributing member for connecting consecutively the various fuel lines arranged symmetrically around the sleeve to the pressure chamber.

On account of the compressibility of the mixture a pressure wave takes a certain amount of time to travel from the distributing or quantity regulating means to the combustion chamber, the same phenomena show up to a smaller degree in a line filled only with a liquid fuel with the high pressures usually employed. For different speeds of the motor therefore the pressure wave must be timed correspondingly which is accomplishd by changing the relative position of the quantity regulating means in respect to the crankshaft of the motor. This is done automatically by a phase regulating mechanism, which is adjusted primarily according to the capacity and to the frictional resistance of the fuel line. This phase regulating means causes an earlier or later start of the pressure wave depending on the rotative speed of the motor, so that the mixture is always injected into the combustion chamber at approximately the same position of the piston. The regulating means may be designed to advance the injection period with increasing speed of the motor. The amount of the advance may be determined by a series of experiments for each type and size of motor.

As has been stated already the amount of lag in the pressure wave varies, with the capacity of and the frictional resistance in the fuel line. In order to reduce this lag a line with gradually decreasing section is used. The larger end is arranged towards the quantity regulating mechanism in order to have a correspondingly larger cross section where the greater volume of mixture must pass.

In order to have a small capacity and a little resistance in the valve towards the combustion chamber the passage for the fuel, has been designed with practically no changes in direction and cross section. The fuel line enters centrally into the valve and is connected to a tubular member which at the same time serves as stop for the needle valve proper. The mixture passes through a central hole in the valve stem close to the conical end and from there through several small holes to a recess under the seat, from where it enters into the combustion chamber when the valve is lifted by a pressure wave.

It is difficult even with excellent workmanship to prevent small leakages especially when handling a mixture of liquid fuel and air. To conduct this leakage back to the pump there has been provided a second tube surrounding the fuel line through which the leakage may pass.

In order to close the valve towards the combustion chamber quickly and to prevent thereby a seeping through and possibly coking of fuel in the hole it is necessary to reduce the pressure suddenly in the fuel line. This is accomplished by providing a chamber under lower or medium pressure in the mixing pump besides the chamber under high pressure and by connecting the fuel line consecutively with these two chambers. The chamber under medium pressure is connected to one stage in the mixing and compression process of the pump and mixture passing from the fuel line into the chamber under medium pressure is again pressed into the high pressure chamber. This circuit of a part of the mixture tends to improve the quality of the mixture.

In order to keep the pressure in the chambers under high and medium pressure in fixed relation to each other there has been provided a differential piston which is designed to serve at the same time as a relief valve permitting mixture to stream from the high to the low pressure chamber as soon as the relative pressure in the high pressure chamber reaches too high a value. To keep the absolute pressures in these two chambers constant there has been provided another relief valve which allows mixture to escape to the fuel tank as soon as the pressure in the chambers exceeds a fixed value. The mixture thus brought into the fuel tank separates into fuel and air and the quantity of air contained is sufficient to create a low pressure in the tank. The fuel in this manner is pressed through a filter into the suction line of the pump. A relief valve in the fuel tank permits excessive air to escape.

On account of leakages the pressure in the chambers drops when the motor is standing still for some time. The pump therefore when starting again would have to make a number of revolutions before sufficient pressure is raised to lift the injection valve. This difficulty is overcome by arranging an additional pressure chamber connected with the high pressure chamber through a valve. When starting the valve needs only be lifted to permit the mixture contained in the additional chamber to expand into the high pressure chamber. The resulting pressure which is somewhat lower than the normal depending on the size of the additional chamber is high enough to inject fuel right away into the combustion chamber.

Besides the mechanism for mixing and compressing liquid and air there are provided and hereinafter described in detail a fuel tank, a device for regulating and distributing the mixture, means for changing the phase of the regulating device and a fuel line with the closing valve towards the combustion chamber.

The housing of the mixing pump consists of three principal parts, a body 1, a cover 2, and a base 3. The base 3 is fastened directly to a frame 12 of the combustion motor. A fuel tank 4 (Figure 1) is connected to the pump by two tubes one arranged inside of the other, the smaller inner one is the suction line 5 while the larger outside tube 6 leads excess mixture back to the tank. The suction line 5 takes the liquid fuel from the interior of a double cylindrical filter 7 and 8, while the over flow line 6 is only connected to the cover 11 which is fastened airtight to the tank 4. The amount of fuel in the tank can be controlled by a gauge 9. A relief valve 10 regulates the pressure in the tank permitting excessive air to escape, which has entered through the tube 6, as will be described later. In this manner the fuel is delivered through the suction line to the pump under a certain initial pressure.

The piston 14 of the engine drives a crank shaft 13 through a connecting rod 15. The mixing pump is driven by a shaft 21 in fixed relation to the crank shaft 13 of the motor, which drive has not been shown. For the proper functioning of the motor a fixed relation of speed is not required but in the arrangement illustrated the devices for regulating the quantity and for distributing the mixture are driven also by this shaft and these devices must be driven in fixed relation to the motor. The shaft 21 (Fig. 4) has three cranks 22, 23 and 24 of which the first actuates an air piston 25 through a pitman 26, the second a fuel piston 27 through a pitman 28 and the third a mixing piston 29 through a pitman 30. The pitmen are milled out like a fork and are held to the respective crank pin by an intermediate piece 31 (Fig. 3) and a pin 32. On the piston end the pitmen are shaped like a ball and are fastened to the pistons by pins 33. The pistons are designed without shoulder in order to have straight through holes in the body 1. The air piston 25 is recessed on both ends in order to save weight on this reciprocating part. The upper recess is closed airtight by a plate 34 in order to prevent it from communicating with the piston chamber 47.

The liquid fuel enters from the suction line 5 (Fig. 3) into a bore 35 of the body 1 and from there into the cylinder 36 of the fuel piston 27. For varying the quantity of fuel introduced with each stroke the fuel piston 27 has been made with a turned down portion 37 which fits into a bore 38 of an axially adjustable bushing 39. The bushing 39 may be moved axially by a nut 40 which in turn is held in place by a flange 41. A pin 42 entering into a slot of the cover 2 holds the bushing 39 against turning. The quantity of fuel delivered is varied by having the reduced end 37 of the piston enter more or less deeply into the bore 38. Until the end 37 enters the bore all fluid delivered from the line 5 and the bore 35 into the cylinder is pushed back again into the suction line and the quantity actually delivered is the product out of the area of the turned down portion 37 multiplied by the depth to which it enters into the bore. This quantity of liquid fuel is driven through a central hole 43 (Fig. 3) in the piston and a ball valve 44 into a recess 45 (Fig. 5) on the surface of the piston, from where it is injected through a hole 46 of small diameter into the cylinder 47 of the air piston 25 whereby it is finely divided. The spring on the ball valve 44 holds the latter to prevent fuel entering into the air cylinder as long as it may pass back into the suction line.

When starting the injection the air piston has just begun its compression stroke and when finishing the injection with the fuel piston 27 in the upper dead center the air piston just closes the hole 46 so that nothing may pass back from the air cylinder during the following suction stroke of the fuel piston. When the piston 25 passes through the lower dead center air is sucked into the cylinder 47 from the outside through openings 48, which are closed by a screen 49. When using another gas instead of atmospheric air the openings of course must connect to the receptacle containing or producing this gas, for instance to the exhaust pipe of the motor when using the exhaust gases.

Through a hole 50 in the piston 25 (Fig. 4) the mixture in the cylinder 47 stands in communication with a small recess 51 on the surface of the piston. Near to the upper dead center of the piston movement the recess 51 begins to overlap a hole 52 which leads from the cylinder 47 to the cylinder 53 and now the compressed contents of the cylinder 47 pass through the openings 50, 51 and 52 into the cylinder 53. In this position of the piston 25 or of the crank 22 the crank 24 is approximately on the lower dead center and the opening 52 is not covered by the piston 29. But in the moment when the piston 25 passes the upper dead center, the upper edge of the piston 29 closes the connecting hole 52, in order to prevent any mixture being drawn back to the air cylinder during the suction stroke of the piston 25. The mixture, which has been further improved by passing through the small holes, is now further compressed in the cylinder 53 by the piston 29. The space above the piston stands in communication with a recess 55 (Fig. 3) on the surface of the piston through a central hole 54 in the piston 29. In a certain position of the piston 29 the mixture may pass from the recess 55 through a hole 56 to a recess 57 on the fuel piston 27. The recess 57 makes a connection with a bore 58. (Fig. 5). As soon as the piston 29 has reached the upper dead center, the oil piston 27 (Fig. 3) moving upwards closes the hole 56 in order to prevent the piston 29 on its suction stroke from drawing any mixture back into the cylinder 53.

The very finely divided state of the mixture that actually has been attained has several causes. Once the liquid fuel is being injected under pressure into the air, then fuel and air are pressed together through small apertures and finally the mixture is compressed in several stages.

The method described above of regulating the quantity of fuel by producing a richer or poorer mixture, which can be injected directly into the combustion chamber, is frequently only used as an additional regulating means for instance for great variations in speed and load, while the principal regulation is accomplished by taking a larger or smaller amount of the mixture from a pressure chamber. This regulation is accomplished in the present case by a rotating sleeve, which serves at the same time as a distributor.

The sleeve 71 (Fig. 6) is driven by the main shaft 21 through two spiral gears 72 and 73. The spiral gear 73 drives a shaft 74 which is constructed with a slot 75 as a driver for the sleeve 71. This driving connection permits the sleeve to move axially independent of the shaft 74. The axial adjustment is controlled by a pinion 76 which stands in engagement with a turned part 77 fashioned with circular grooves of the shape of a gear rack. The part 77 is mounted rotatably between a shoulder of the sleeve 71 and the head of a screw 78 fastened in the sleeve. The sleeve 71 rotates in a bushing 79 which is pressed tightly into the body 1 of the pump. The sleeve 71 (Figs. 11–15) has been constructed hollow. An inserted partition 80 held against a shoulder divides the hollow space into two parts 81 and 82, of which 81 is the high pressure chamber and 82 is a chamber under lower pressure.

The compressed mixture passing into the bore 58 as described previously enters into a circular groove 83 on the circumference of the bushing 79 which stands in communication with a circular groove 85 in the bore of the bushing 79 through holes 84. From here the mixture passes through an opening 86 in the wall of the sleeve 71 into the high pressure chamber 81. One or more fuel lines corresponding to the number of cylinders (in Figure 14 three lines are shown) stand in communication with holes 87 in the wall of the bushing 79.

A discontinuous connection with the high pressure chamber 81 is effected during each revolution by an opening 88 of triangular or trapezoid shape in the wall of the sleeve 71. Depending on the axial position of the sleeve a large or smaller section through the opening 88 stands in communication with the holes 87 for the fuel lines, thus measuring off a larger or smaller quantity of fuel for the combustion chamber or chambers. The holes 87 communicate with longitudinal grooves 89 on the circumference of the bushing 79. Radial holes 90 (Fig. 15) connect the grooves with the bore of the bushing 79; thus a recess 91 in the wall of the sleeve 71 leading to the chamber 82 makes a periodical connection during each revolution with the holes 87. The opening 88 and the recess 91 are located in such relation to each other that when shutting off the communication between the fuel line 87 and the high pressure chamber 81 by the controlling edge 92 of the opening 88 the corresponding controlling edge 93 of the recess 91 just opens communication with the chamber 82, which causes a sudden drop of pressure in the fuel line to the pressure in the chamber 82. The openings 86, 88 and 91 are so arranged in size and position to each other with regard to the different pressures in the two chambers 81 and 82 as to relieve the sleeve from any hydrostatic pressure (Fig. 12).

A hole 94 (Figs. 6, 11 and 12) and a circular recess 95 in the sleeve 71, a further hole 96, a circular space 97 in the bushing 79 and a hole 98 in the body 1 of the pump connect the chamber 82 with an additional storage room 99 which is provided for a better equalization of pressure. The room 99 is closed on top by a plug 100 pressed tightly into the opening.

In this manner by providing a second room under lower pressure and by connecting this room periodically with the fuel line or lines it becomes possible to suddenly drop the pressure in the fuel line after injecting the mixture into the cylinder. Thus the valve towards the combustion chamber is closed quickly and no fuel can seep past the valve.

Each drop of pressure in the fuel line causes a certain amount of mixture to pass into the pressure chamber 82 and into the room 99 which mixture has to be compressed again. For this purpose there is provided a connecting hole 101 between the room 99 and the cylinder 53 on the same level with the hole 52. Thus simultaneously with the delivery of mixture from the cylinder 47 through the hole 52 mixture also enters from the room 99 into the cylinder 53. The cylinder 53 is constructed large enough to take a sufficient amount of mixture from the room 99.

The ratio of pressure in the high and medium pressure chambers 81 and 82 is governed by a differential piston (Fig. 11), which moves with the smaller diameter 112 thereof in a bore of the intermediate wall 80, while the larger piston is guided in the chamber 82 under medium pressure. With too high a relative pressure in the high pressure chamber the piston 111 is shoved downwards until a hole 113 and a crosshole 114 connect the high pressure chamber 81 with a recess 115 of the chamber 82 under medium pressure and mixture may pass by. A pin 116 through the upper end of the hub of the intermediate wall 80 prevents the piston striking against the wall 80. The movement of the differential piston downwards is limited by the bottom of the chamber.

To prevent the forming of back pressure in the space between the piston 111 and the intermediate wall 80, this space has been connected by a hole in the bushing 79 with a hole 118 (Fig. 2). The hole 118 leads to a circular groove 120 of a connection 119 of the suction line 5. A longitudinal hole 121 (Fig. 3) in the connection communicates with a space 122 between the connection and a nut 123, which latter holds a bushing 124 which is fastened to the pressure line 6 against a nose 125 of the suction line 5 and the nose against a seat in the connection 119. The space 122 stands in communication with the interior of the line 6 through holes 126, thus permitting excessive mixture to pass to the fuel tank 4. To prevent too high a pressure in the room 82 there has been arranged a relief piston 131 (Fig. 11) in the hub of the differential piston 110 which is held by a spring 132 against a pin 133. Increasing pressure in the room 82 presses the piston 131 back until holes 134 in the piston permit the mixture to enter into a recess 135. The recess 135 communicates through a hole 136 with the space between the differential piston 111 and the intermediate wall 80 from where the excess mixture is conducted into the hole 118 and into the fuel tank 4, as described above.

A similar mechanism for regulating and distributing the quantity of fuel is shown in the Figures 18 to 21, with the main difference that reciprocating instead of rotating regulating members are used. There are provided here also two chambers filled with fuel mixture, one 151 under high pressure and the other 164 under lower pressure. The bore 152 of a bushing 153 communicates with the chamber 151. A regulating piston 154 is moved up and down in the bore 152 by a cam 155 located on the main shaft of the pump. On this cam 155 there are provided a number of equal depressions 156 corresponding in number to the number of combustion chambers and located at a distance to each other of 360° divided by the number of cylinders. Between the cam 155 and the regulating piston 154 there is arranged an intermediate lever 157 with a roller 158 to reduce the friction. A recess 159 on part of the exterior circumference of the bushing 153 which is pressed tightly into the pump body 160 stands in communication with the bore 152 through holes 161 and 162. Further holes 163 connect the bore 152 with the chamber 164 under lower pressure. A recess 165 of the regulating piston 154 connects at a certain position of the piston the holes 162 and 163 and in this manner the recess 159 with the chamber 164. A hole 166 connects the recess 159 with a groove 167 in the bore 168 of a second bushing 169. A distributing piston 170 moves up and down in the bore 168 and is provided with a number of circular grooves 171 which make connections between the groove 167 and one of the holes 172 depending on the axial position of the piston. Fuel lines 173 are connected to the holes 172. One recess 171, hole 172 and fuel line 173 each are provided for each combustion chamber.

The axial position of the distributing piston 170 is changed by a cam 174 fastened to the cam 155. Between the cam 174 and the piston 170 there is arranged a lever 175 with a roller 176. The cam 174 is fashioned with a number of steps (Fig. 21) the number of which corresponds to the number of combustion chambers. In order to hold the distributing piston tightly to the cam even under high speeds, a space 177 above the piston 170 is connected with the room 151 under high pressure thus bringing the upper end of the piston under the influence of the high pressure. The holes 161 and 162 have been arranged in such a way that at the beginning of communication of the high pressure chamber with the hole 161 when the regulating piston 154 is going down, the edge of the recess 165 just closes the hole 162. Now a pressure wave starts from the high pressure room through the hole 161 into the recess 159 and from there through the hole 166 into the groove 167. According to the position of the distributing piston 170 this wave is conducted to one of the fuel lines 173 through the corresponding circular groove 171 and hole 172.

Changes in the duration of the injection are obtained by changing the shape of the cam. For this purpose the recess 156 of the cam 155 is formed wider towards one end and the intermediate lever 157 is moved sideways in order to have a recess of greater or smaller width regulate the duration of the pressure wave. The lever 157 is fastened to a shaft 178 which is moved axially by a pinion 179 engaging with rack shaped grooves on the shaft. The pinion is fastened on a shaft 181. A movement of a lever 180 also fastened to the shaft 181 regulates thus the quantity of fuel injected.

A bore 182 (Fig. 20) connects the high pressure chamber 151 with the room 164 under medium pressure. Into the upper part of this hole there has been pressed a bushing 183. A differential piston 184 fits with the smaller end in the bore of the bushing 183 while the larger end moves in the lower part of the bore 182. A hole 185 connecting the space between the bushing 183 and the differential piston 184 with the interior of the base of the pump prevents a collection of fluid under pressure.

In the differential piston 184 there is provided a central hole 186 leading from the high pressure side towards a cross hole 187. When moving the piston downwards fuel mixture may pass from the high pressure to the medium pressure room, whereupon the medium pressure rises instantly and moves the piston 184 back to its normal position. In order to prevent the pressures in the rooms 151 and 164 to exceed a certain value a relief valve 188 has been arranged. The piston 188 moving in a bore 190 of a connector 191 is supported by a spring 189 against the medium pressure. A screw 192 may vary the compression of the spring. Any excessive fuel passes off through a hole 193 at right angles to the bore 190 into a line 194 as soon as the piston 188 has been shoved back by too high a pressure. The pipe line 194 is connected to the fuel tank.

The cam 155 (Fig. 18) on the main shaft of the pump has on one side an extension like a bushing on which spiral grooves 195 have been cut. Pins 196 of a bushing 197 engage with these grooves. The bushing 197 is driven through a key 198 by the main shaft and can be adjusted axially by a nut 199, causing the pins 196 to slide in the spiral grooves 195 and to turn the cam 155 in relation to the shaft. In this manner the angular position relative to the shaft of the pump of the cam controlling the injection can be altered at will during operation.

The relative adjustment of a rotating distributor, as shown in Figure 5, is effected in a similar manner by moving axially the driving spiral gear 72 (Fig. 6). This gear is fastened radially to the main shaft 24 by a number of splines or keys but may be moved axially. For this purpose there is provided a shoulder 211 on the gear which is held axially between the face of a bushing 212 and a cover plate 213 fastened to the bushing. The bushing 212 is provided with a threaded portion 214, thus when turning the bushing the spiral gear 72 moves axially towards the right or left, which causes a relative turning movement of the driven gear 73 on account of the spiral shape of the engaging teeth. The gear 72 has a bearing on a bushing 215 which bushing supports also the shaft 21. The crank shaft 21 has a bearing on the other end in a bushing 210 which is held in the base 3 of the pump by a set screw 209. In order to facilitate the assembly of the pump the diameter of this bushing has been made quite large.

To time the beginning of the injection of the mixture into the combustion chamber automatically for different speeds of the motor there is provided a shaft governor. The spiral gear 73 (Fig. 5) is not connected directly to the sleeve 71 but is held against a shoulder of the sleeve 218 by a nut 216 and a washer 217. The sleeve 218 forms part of the governor housing 219 and has a bearing in a bushing 220 pressed into a bore of the pump base 3. In the bore of the sleeve 218 there is a shaft 74, which has been milled out to receive the tongue 75 of the sleeve 71. A spiral spring 222 is fastened with one end to a pin 223 in the wall of the governor housing 219 while the other end is fastened to a similar pin 224 in the hub of a cover 225. The cover serves at the same time for closing the housing 219 and is held tight against a shoulder of the shaft 74 by a nut 226. In this manner there is exerted a constant turning moment by the spring 222 on the shaft 74. A governor body 227 (Fig. 8) with two guiding pins 228 and 229 opposite each other is fastened by a pin 230 onto the shaft 74. Two governor weights 231 and 232 are guided on the pins 228 and 229 by three small rollers 233 each. To reduce the friction of the rollers they are provided on both ends with conical points which rest in corresponding depressions of small pins 234 and 235. The latter are pressed into holes in the weights 231 and 232 (Fig. 10). In the center of gravity of each governor weight there are journaled one on each side two rollers 236 and 237 on pins 238 and 239. The rollers are guided in cam grooves 240 and 241 (Fig. 9) which are fashioned into the housing 219 and also into an intermediate wall 242. A certain torsional movement of the governor or the shaft 74 in relation to the driving sleeve 218 is determined for each different rotative speed by the curvature of the grooves 240 and 241, the initial tension and the strength of the spring 222. In case the most favourable timing of the injection of fuel, which means the angular torsional movement between the shaft 74 and the sleeve 218, has been determined for different speeds of a certain internal combustion engine, the shape of the grooves 240 and 241 may readily be figured analytically and also be checked afterwards by a simple test tool.

In the body 1 of the pump there is arranged an additional pressure chamber 251 (Fig. 7) for setting the pressure chamber under pressure after a period of rest. The bore 251, which is closed by a screw plug 252 communicates through a hole 253 and a vertical connecting hole 250 with the high pressure line 58 (Fig. 5) between pump and regulating means. A relief ball valve 255 held by a spring 254 prevents the escape of the mixture stored in the chamber 251. The ball 255 may be lifted from its seat by pressing on a pin 256 with a head 257. Then the stored mixture expands into the pressure line and causes an increase of pressure, the height of which depends on the sizes of the chamber 251 and of the chambers under high and medium pressure and on the quality of mixture used. A cone shaped part 258 is fastened to the pin 256 to prevent any mixture from escaping past the pin.

In order to keep the volume of the fuel line and the friction therein as small as possible the holes 87 (Figs. 5 and 14) and the diameter of the bore of the fuel line 271 (Fig. 16) have been constructed with larger diameter in the neighbourhood of the regulating means than near to the combustion chamber. For this purpose one or several steps are provided by brazing or welding a tube 272 of smaller bore with a conical opening 273 to the larger tube 271 with a tubular sleeve 274 as a connection between the tubes.

In order to construct the valve towards the combustion chamber with small capacity and low resistance, the fuel line 272 is inserted axially into a stem 275 and is held by a screw 276, which is brazed to the tube, against a conical seat of the bore in the stem 275. In this manner the bore 277 in the tube 272 leads without break or step into the bore of the stem 275. The end of the stem fits slidingly in a bore of a bushing 278. The valve proper 279 is pressed into the lower end of the bore in the bushing 278. The hole in the stem 275 finds a continuation in a hole of the valve 279 which extends nearly to the conical end of the valve and several small holes 280 connect with a space 281 under the turned down portion of the conical face of the valve 279. The bushing 278 with the valve 279 fits slidingly in a bushing 282 pressed into the valve body 283. The bushing 278 and the valve 279 have been made of two parts in order to have a through bore in the part 278 which can be adjusted and lapped far better than a blind hole. A spring 284 is inserted between the bushing 278 and a threaded adjusting screw 285, which latter is held against movement by a set screw 286 and a plug 287 of softer material. A shoulder 288 on the stem 275 abuts against a screw 289.

A pressure wave travelling through the fuel line lifts the valve 279 and the bushing 278 against the pressure of the spring 284 until the upper end of the valve 279 touches the end of the stem 275. With decreasing pressure in the fuel line the valve 279 is seated again by the spring 284. The stem 275 although not positively connected to the valve 279, can partly follow the movements of this member. The fuel mixture is blown through the opening 290 into the combustion chamber. The opening does not need to be kept very small as with airless injection because in the present case the expansion of the enclosed air tears the particles of fuel apart very effectively.

In Fig. 17 there is shown a somewhat different form of valve housing without a separate bushing 282 but in order to have a through bore for the valve 279 with the bushing 278 a separate lower end 270 is provided which is screwed on to the valve body 283.

Even when manufacturing and fitting the valve and the parts belonging to it very precisely a small amount of leakage is difficult to prevent. In order to lead therefor any possible leakage back to the pump there has been provided a second tube 291 surrounding the line 271, 272 with a certain clearance. The tube 291 is connected to the valve by a nut 292 which presses the flared out end 293 of the tube 291 against an intermediate tubular part 294, which is cut open on one side in order to permit removal after moving the nut 292 back. This is necessary in order to get at the screw 276. The hole in the nut 289 allows the stem 275 sufficient play so that any leakage may pass by into the tube 291.

The connection of the pipe lines to the pump body 1 (Fig. 5) is constructed in similar manner. A plug 295 screwed into the body 1 has a central bore 296 in line with the hole 87. A nut 297 pulls a sleeve 298 brazed to the tube 291 against a nose 299 and the latter into a seat in the plug 295. The nose 299 is fastened to the fuel line 271. The inner space of the tube 291 communicates through small holes 300 in the sleeve 298 with a room 301 underneath the nut 297 and this room is connected through a hole 302 with a circular channel 303 on the face of the plug 295. A hole 304 and cross holes 305 and 306 (Fig. 2) connect the circular channel 303 with the similar channels of the other two fuel lines. The hole 306 leads the leakage into the circular channel 120 of the overflow line 6 from where it passes into the fuel tank 4, as previously described.

Having now particularly described the nature of my said invention and in what manner the same is to be performed, I declare that what I claim is:

1. In internal combustion engines of the type where the fuel is injected into the combustion chamber at or near the end of the compression period, means independent of said chamber for mixing liquid fuel with a gas comprising separate compressing devices having a connecting passage, means for compressing the mixture and means for regulating the quantity of mixture injected into the combustion chamber.

2. In internal combustion engines of the type where the fuel is injected into the combustion chamber at or near the end of compression, a device for compressing gas, means for injecting liquid fuel into said device, means for subsequently compressing the mixture, and means for regulating the quantity of mixture injected into the combustion chamber.

3. In internal combustion engines of the type where the fuel is injected into the combustion chamber at or near the end of compression, a device for compressing gas, means for injecting liquid fuel under pressure into said device to form a mixture with the gas therein, separate means for compressing the mixture, and means for conducting it to the combustion chamber.

4. In internal combustion engines of the type where the fuel is injected into the combustion chamber at or near the end of compression, means for compressing the gas, means for mixing liquid fuel with the gas, separate means for compressing the mixture, said mixing and compressing means being conducted in a plurality of stages, and means including a pipe line for conducting the compressed mixture to the combustion chamber, said pipe line having a valve for discharging the mixture into said chamber, the valve being moved by the pressure of the mixture in a direction opposite to that in which the mixture flows when entering said chamber.

5. In internal combustion engines of the type where the fuel is injected into the combustion chamber at or near the end of compression, means for compressing a gas, means for driving liquid fuel under pressure into the compressed gas, means for compressing the mixture, a distributor for the mixture and means for conducting the distributed parts of the mixture to the combustion chambers of the engine.

6. In internal combustion engines of the type where the fuel is injected into the combustion chamber at or near the end of compression, a device for compressing gas, a separate device for injecting liquid fuel under pressure into the first mentioned device, means for compressing the mixture in a plurality of stages and means for regulating the quantity of mixture to be injected into the combustion chamber.

7. In internal combustion engines of the type where the fuel is injected into the combustion chamber at or near the end of compression, means for compressing liquid fuel and a gas in a plurality of stages, small apertures between the stages through which the mixture is driven, and means including a power driven distributor for regulating the quantity of mixture to be injected into the combustion chamber and for directing the mixture to a plurality of said chambers.

8. In internal combustion engines of the type where the fuel is injected into the combustion chamber at or near the end of compression, a device for compressing gas, a device for injecting liquid fuel under pressure into the compressed gas, means for subsequently compressing the mixture in a plurality of stages, and small apertures between the stages through which the mixture is driven.

9. In internal combustion engines, a combustion chamber, means including a piston for compressing air in said chamber, a device for compressing gas, means for mixing the liquid fuel with the gas, means for subsequently compressing the mixture, and means for delivery of the compressed mixture into the air for the combustion chamber under a greater pressure than that in said chamber whereby to afford a very effective disruption of the liquid fuel.

10. In internal combustion engines of the type where the fuel is injected into the combustion chamber at or near the end of compression, a device for mixing and compressing liquid fuel and a gas, said device being arranged separate from the combustion chamber and receiving its supply of gas from a source independent of the combustion chamber, and power driven means for regulating the quantity of mixture to be injected each time into the combustion chamber.

11. In internal combustion engines of the type where the fuel is injected into the combustion chamber at or near the end of compression, a device for mixing liquid fuel and a gas in measured quantities, means for subsequently compressing the mixture, a distributor for the mixture and means for conducting the mixture from the distributor to a plurality of combustion chambers.

12. In internal combustion engines of the type where the fuel is injected into the combustion chamber, a reciprocating piston for measuring the quantity of liquid fuel, and another reciprocating piston spaced from the first for measuring off a quantity of a gas supplied from a source independent of the combustion chamber, said fuel piston pressing the liquid fuel into the cylinder of said gas piston and said gas piston compressing the mixture.

13. In internal combustion engines of the type where the fuel is injected into the combustion chamber at or near the end of compression, an air pump, means for pressing a measured quantity of liquid fuel into the compression chamber of said air pump, said air pump mixing and compressing the liquid fuel and atmospheric air to the desired injection pressure and a power driven distributor for directing the mixture to a plurality of combustion chambers.

14. In internal combustion engines of the type where the fuel is injected into the combustion chamber at or near the end of compression, means for mixing and compressing liquid fuel and a gas, means for subsequently compressing the mixture, a capacity for storing the compressed mixture, and means for regulating the quantity of mixture injected into the combustion chamber.

15. In internal combustion engines of the type where the fuel is injected into the combustion chamber at or near the end of compression, a pump for mixing and compressing liquid fuel and atmospheric air, a room in said pump for storing a quantity of the compressed mixture, and power driven means for regulating the quantity of mixture taken out of said storing room and injected into the combustion chamber.

16. In internal combustion engines having a combustion chamber, a piston for compressing air therein, a pump for mixing and compressing liquid fuel and atmospheric air, a storage chamber for storing a quantity of the compressed mixture, power driven means for regulating the quantity of the mixture drawn each time from said storage chamber, and means for delivery of the compressed mixture into the air for the combustion chamber.

17. In internal combustion engines of the type where the fuel is injected into the combustion chamber at or near the end of the compression period, means for forming and compressing a mixture of liquid fuel and a gas, means for intermittently connecting the mixture to the combustion chamber, and different means for conducting part of the mixture in a circuit in line with the normal flow of the mixture.

18. In internal combustion engines of the type where the fuel is injected into the combustion chamber at or near the end of the compression period, separate cooperating pumps for forming and compressing a mixture of liquid fuel and a gas, means affording storing capacity for a quantity of the compressed mixture, and means for regulating the quantity of mixture taken out of storing capacity and injected into the combustion chamber.

19. In internal combustion engines a pump for mixing and compressing liquid fuel and a gas, a plurality of pistons in said pump and a plurality of cylinders, one for each piston, said pistons operating one for compressing a gas and another for injecting fuel into the gas during compression thereof.

20. In a fuel pump for internal combustion engines, two reciprocating pistons and two gas and fuel receiving cylinders, said pistons operating simultaneously, one to transfer the contents of its cylinder into the next while the piston in the latter is compressing the contents therein.

21. In a fuel pump for internal combustion engines, two cylinders and two reciprocating pistons, one of said pistons regulating the beginning and the other of said pistons the end of the transfer of the contents from one to the other of said cylinders, means for subsequently compressing said contents and means for transferring the same to the combustion chamber.

22. In a fuel pump for internal combustion engines, two fuel control cylinders and two pistons, one of said pistons controlling the movement of the contents of the one of said cylinders in which said piston reciprocates and controlling also the transfer of the contents of the other of said cylinders into another room and independent means for periodically effecting delivery of the fuel to the combustion chamber.

23. In a fuel pump for internal combustion engines two cylinders, two pistons reciprocating in said cylinders, a recess on one of said pistons, a receiving chamber, said recess on one of said pistons together with the second of said pistons controlling the transfer of the contents of the one of said cylinders in which the second piston reciprocates into said chamber and a distributor interposed between said chamber and a combustion chamber of the engine.

24. In a fuel pump for internal combustion engines two cylinders, two independent pistons in said cylinders, a crank shaft, a connecting rod between each piston and the crank shaft, a connecting passage between said cylinders, said pistons serving to close said connecting passage part of the time and means for conveying the fuel to the combustion chamber.

25. In a fuel pump for internal combustion engines, a combustion chamber, a cylinder independent of the combustion chamber, a piston reciprocating in said cylinder, a recess on the circumference of the piston, a connection between said recess and the space above said piston, a passage in the wall of said cylinder for transferring the contents of said cylinder, the edge of said recess coacting with said passage in determining the beginning of the transfer and means for intermittently establishing communication between said passage and the combustion chamber.

26. In internal combustion engines of the type where the fuel is injected into the combustion chamber at or near the end of compression, a chamber containing liquid fuel under high pressure, a chamber under lower pressure, a fuel line leading from the high pressure chamber to the combustion chamber, mechanism including a compression chamber for mixing and compressing liquid fuel and gas arranged to periodically deliver charges to said high pressure chamber, means for connecting consecutively both said high and low pressure chambers and a connection between the low pressure and compression chambers.

27. In internal combustion engines of the type where the fuel is injected into the combustion chamber at or near the end of compression, means for forming and compressing a mixture of liquid fuel and a gas, a chamber for storing the compressed mixture, a second chamber containing mixture of a lesser degree of compression, a fuel line leading to the combustion chamber, and means for connecting consecutively both said chambers with said fuel line.

28. In internal combustion engines of the type where the fuel is injected into the combustion chamber at or near the end of compression, a plurality of combustion chambers, means for mixing liquid fuel with a gas, means for regulating the quantity of mixture for each injection into a combustion chamber, and means for distributing the mixture to said different combustion chambers including a rotary sleeve having spaced inlet and outlet ports.

29. In internal combustion engines of the type where the fuel is injected into the combustion chamber at or near the end of compression, a plurality of combustion chambers, means for mixing and compressing liquid fuel and a gas, a pressure chamber, a chamber for storing a quantity of the compressed mixture, means for periodically connecting the pressure chamber with the storage chamber and for regulating the quantity of mixture drawn from said storage chamber for each injection, and means for distributing the mixture apportioned by said regulating means consecutively to said different combustion chambers.

30. In internal combustion engines of the type where the fuel is injected into the combustion chamber at or near the end of compression, means for mixing and compressing liquid fuel and a gas, a chamber for storing a quantity of the compressed mixture, means for regulating the quantity of mixture drawn from said storage chamber for each injection, and a second chamber also filled with mixture under pressure, for putting said first chamber under pressure when starting the motor after a period of rest.

31. In internal combustion engines of the type where the fuel is injected into the combustion chamber at or near the end of compression, a device for mixing and compressing liquid fuel and a gas, a pressure chamber, a chamber for storing a quantity of the compressed mixture, and a rotating member for drawing a certain quantity of mixture from said storage chamber for each injection adapted to periodically establish communication between said chambers.

32. In internal combustion engines of the type where the fuel is injected into the combustion chamber at or near the end of compression, a plurality of combustion chambers, means for mixing and compressing liquid fuel and a gas, and means for regulating the quantity of mixture apportioned for each injection, said regulating means also distributing the apportioned quantity of mixture for each injection consecutively to said different combustion chambers and serving to automatically effect a reduction of pressure in the supply line following distribution to the combustion chambers.

33. In internal combustion engines of the type where the fuel is injected into the combustion chamber at or near the end of compression, a plurality of combustion chambers, a pump for mixing and compressing liquid fuel and a gas, and a rotating sleeve having spaced inlet and outlet ports for apportioning the quantity of mixture for each injection and for distributing at the same time this apportioned quantity consecutively to said different combustion chambers.

34. In internal combustion engines of the type where the fuel is injected into the combustion chambers at or near the end of compression, a fuel pump for mixing and compressing liquid fuel and a gas, means for regulating the quantity of mixture conducted to the combustion chamber, said regulating means also determining the timing of the injection, and a governor rotating in fixed relation to the combustion engine, said governor changing the timing of said regulating means.

35. In a fuel pump for internal combustion engines controlling means including a rotary sleeve for timing the injection of the fuel into the combustion chamber, driving means for the sleeve, and a governor connected with the driving means for changing the timing of said controlling means.

36. In a fuel pump for internal combustion engines a rotating member having separate fuel inlet and outlet ports, the latter determining the timing of the fuel into the combustion chamber and a governor for changing the timing of said rotating member.

37. In an internal combustion engine means for putting fuel under pressure, a rotating member turning in relation to the internal combustion engine and having separate fuel inlet and outlet ports, said rotating member controlling the injection of fuel, and a governor also turning in relation to the internal combustion engine, said rotating governor changing the phase of said rotating member according to the speed the engine is running at.

38. In an internal combustion engine a fuel pump for setting the fuel under pressure, a rotating member rotating in relation to the engine and having separate fuel inlet and outlet ports, the latter provided for controlling the injection of fuel, a governor also rotating in relation to the engine, and means for having the governor change the phase of said rotating member to correspond to the most favourable timing of the injection found by experiments for a certain type of motor.

39. In a fuel pump for internal combustion engines an air piston, a piston delivering liquid fuel into the cylinder of said air piston, said air piston compressing the mixture and a third piston for further compressing the mixture.

40. In a fuel pump for internal combustion engines means for mixing and compressing liquid fuel and a gas in two stages, a room for storing a quantity of mixture under full pressure and a second chamber for storing a quantity of mixture under lower pressure arranged between the two stages of compression.

41. In internal combustion engines of the type where the fuel is injected into the combustion chamber at or near the end of compression, a pump for mixing and compressing liquid fuel and a gas comprising a cylinder, a piston in said cylinder for delivering the liquid fuel, and means adjustable independently of the cylinder and coaxial therewith for regulating the active stroke of said piston during which liquid fuel is delivered for the mixing process.

42. In a fuel pump for internal combustion engines means for mixing and compressing liquid fuel and a gas included a cylinder, a piston fitting said cylinder for delivering the liquid fuel in the mixture, a bushing arranged coaxially with and separate from said piston, the bore of said bushing fitting over a corresponding part of said piston, and means for adjusting said bushing axially, thereby varying the quantity of liquid fuel delivered.

43. In a fuel pump for internal combustion engines a cylinder having a piston fitted therein for controlling the quantity of liquid fuel delivered, a bushing arranged coaxially with said cylinder and adjustable independently thereof, a bore in said bushing working together with a corresponding part of said piston determining the quantity of liquid delivered, and means for changing the respective axial location of said bushing and said cylinder.

44. In a fuel pump for internal combustion engines a cylinder having a piston for controlling the quantity of liquid fuel delivered having a passage therethrough, a bushing arranged coaxially with said cylinder with a bore for said piston to enter, means for changing the respective axial location of said bushing and said cylinder, and a check valve in said passage for controlling the fluid delivered therethrough.

45. In a fuel pump for internal combustion engines a reciprocating piston for controlling the quantity of liquid fuel delivered, a bushing arranged coaxially with said piston with a bore for said piston to enter, means for changing the respective axial position of said bushing to said piston, a passage in the piston for discharging the fuel delivered, a check valve in said passage only permitting liquid fuel to travel in one direction, and a resistance on said check valve only permitting liquid to pass after a certain pressure has been exceeded.

46. In a fuel pump for internal combustion engines for mixing and compressing liquid fuel and a gas, a piston for controlling the quantity of liquid fuel, another piston for controlling the quantity of the gas, a bushing arranged coaxially with said piston with a bore for said piston to enter, means for changing the axial location of said bushing without changing the position of said fuel piston, a passage between the cylinder for said fuel piston and the cylinder for said gas piston, and a check valve located in said passage offering a certain resistance against the passing of the fuel.

47. In a fuel pump for internal combustion engines for mixing and compressing liquid fuel and a gas, a piston for controlling the quantity of liquid fuel, a second piston for controlling the quantity of gas, and a third piston for compressing the mixture, said fuel and gas pistons regulating the transfer of the fuel into the cylinder of said gas piston, and said gas and mixture pistons regulating the transfer of the mixture into the cylinder of said mixture piston.

48. In a fuel pump for internal combustion engines for mixing and compressing liquid fuel and a gas, a piston for controlling the quantity of liquid fuel, a second piston for controlling the quantity of gas, and a third piston for compressing the mixture, said fuel and gas pistons regulating the transfer of the fuel into the cylinder of said gas piston, said gas and mixture pistons regulating the transfer of the mixture into the cylinder of said mixture piston, and the mixture and fuel pistons regulating the discharge of the compressed mixture from the cylinder of said mixture piston.

49. In internal combustion engines of the type where the fuel is injected into the combustion chamber at or near the end of compression, a chamber containing fuel under high pressure, another chamber containing fuel under a lower pressure, a line for leading the fuel to the combustion chamber, means for connecting said fuel line with said high pressure chamber during part of each revolution of the engine, means forming a unit with the first mentioned means for connecting said fuel line to said chamber under lower pressure approximately at the same time when the connection with said high pressure chamber is closed, said connection with said chamber under lower pressure being closed before said first connection to the high pressure chamber has been opened and fuel compressing means for delivering the fuel to the high pressure chamber.

50. In internal combustion engines of the type where the fuel is injected into the combustion chamber at or near the end of compression, a chamber containing fuel under high pressure, another chamber containing fuel under a lower pressure, a line for leading fuel to the combustion chamber, means for connecting said fuel line alternately to said chambers under high and lower pressure, and means for holding the pressure in said chamber under lower pressure at about the maximum pressure arising during the compression stroke in the combustion chamber of the engine.

51. In internal combustion engines of the type where the fuel is injected into the combustion chamber at or near the end of compression, a chamber containing fuel under high pressure, a chamber containing fuel under a lower pressure, a fuel line leading to the combustion chamber, means for holding normally closed said fuel line towards the combustion chamber, said closing means only opening when fuel under high pressure is contained in the fuel line but closing as soon as the pressure drops, means movable with and relative to said first mentioned means for connecting alternately said fuel line with said chambers under high and lower pressure and fuel compressing means for delivering the fuel to the high pressure chamber.

52. In internal combustion engines of the type where fuel is injected into the combustion chamber at or near the end of compression, a chamber containing fuel under high pressure, a chamber containing fuel under a lower pressure, a fuel line leading to the combustion chamber, means for connecting alternately said fuel line with said chambers under high and lower pressure, a valve movable with and relative to said means for closing the fuel line towards the combustion chamber, any pressure in said fuel line tending to open said valve, means for holding said valve closed against the pressure in the fuel line, said closing means being proportioned to hold said valve closed with fuel under the lower pressure in the fuel line but permitting said valve to open with fuel under the high pressure in the line and fuel compressing means for delivering the fuel to the high pressure chamber.

53. In internal combustion engines of the type where the fuel is injected into the combustion chamber at or near the end of compression, a chamber containing fuel under high pressure, a different chamber containing fuel under a lower pressure, means for compressing and delivering fuel to the high pressure chamber, a fuel line leading to the combustion chamber, closing means towards the combustion chamber opening only under the high pressure but not under the lower pressure, two passages connecting to said fuel line, and a regulating device establishing alternate communication of said passages with said chambers under high and lower pressure, said closing means being movable with and relative to said regulating device.

54. In internal combustion engines of the type where the fuel is injected into the combustion chamber at or near the end of compression, means for mixing and compressing liquid fuel and a gas, a chamber for storing a quantity of the compressed mixture, a fuel line for leading the mixture to the combustion chamber, means partially surrounding the chamber for connecting it with said fuel line, and different means for changing the duration of this connecting period.

55. In internal combustion engines of the type where the fuel is injected into the combustion chamber at or near the end of compression, means for mixing and compressing liquid fuel and a gas, a chamber for storing a quantity of the compressed mixture, a fuel line for leading the mixture to the combustion chamber, means partially surrounding the chamber for connecting it with said fuel line during a certain angular movement of the crankshaft of the engine and different means for changing the angular duration of this connecting period.

56. In internal combustion engines of the type where the fuel is injected into the combustion chamber at or near the end of compression, means for mixing and compressing liquid fuel and a gas, a rotating member having a distributing portion for regulating the quantity of mixture injected into the combustion chamber, and a chamber in said rotating member for storing a quantity of compressed mixture arranged to periodically communicate with said combustion chamber.

57. In internal combustion engines of the type where the fuel is injected into the combustion chamber at or near the end of compression, means for mixing and compressing liquid fuel and a gas, a rotating member, means for rotating said member in fixed relation to the combustion engine, a chamber in said rotating member filled with the compressed mixture, a fuel line for leading mixture and periodically receiving its supply from said compressing means to the combustion chamber, a passage connecting during a part of each revolution of said rotating member said chamber with said fuel line, and means for moving said rotating member axially, the period of connection depending on the axial position of said rotating member.

58. In internal combustion engines of the type where the fuel is injected into the combustion chamber at or near the end of compression, means for putting liquid fuel under pressure, a rotating member, a chamber in said rotating member for containing fuel under pressure arranged to periodically receive its supply from said pressure means, a fuel line leading fuel to the combustion chamber, an opening of approximately triangular shape connecting during a part of each revolution of said rotating member said chamber with said fuel line, and means for moving said rotating member axially, the part of a revolution during which connection is established depending on the axial position of said rotating member.

59. In internal combustion engines of the type where the fuel is injected into the combustion chamber at or near the end of compression, means for mixing and compressing liquid fuel and a gas, a rotating member, a line for leading mixture to the combustion chamber, a chamber in said rotating member filled with compressed mixture, a second chamber also in said rotating member filled with mixture under a lower pressure and means for connecting consecutively both said chambers with said fuel line.

60. In internal combustion engines of the type where the fuel is injected into the combustion chamber at or near the end of compression, means for putting liquid fuel under pressure, a rotating member, a line for leading fuel to the combustion chamber, a chamber in said rotating member containing fuel under pressure, a second chamber in said rotating member containing fuel under a lower pressure, openings in the walls of both said chambers, said openings connecting consecutively with said fuel line.

61. In internal combustion engines of the type where the fuel is injected into the combustion chamber at or near the end of compression, means for putting liquid fuel under pressure, a rotating member, means for rotating said member in fixed relation to the engine, a chamber in said rotating member containing fuel under pressure, a second chamber in said rotating member containing fuel under a lower pressure, a passage in the wall of said first chamber, and a second passage in the wall of said second chamber the opening edge of said second passage establishing communication between the fuel line and the chamber under lower pressure at approximately the same time when the closing edge of said first passage closes the communication between the chamber under high pressure and the fuel line.

62. In internal combustion engines of the type where the fuel is injected into the combustion chamber at or near the end of compression, a pump for mixing and compressing liquid fuel and a gas, a pressure line, a rotating member rotating in fixed relation to the engine, a chamber in said rotating member, and means for periodically connecting said chamber with said pressure line.

63. In internal combustion engines a device for mixing and compressing liquid fuel and a gas, a pressure line for the compressed mixture, a member rotating in fixed relation to the engine, a chamber in said rotating member, a circular recess standing in connection with said pressure line, and passages for periodically connecting said recess with said chamber.

64. In internal combustion engines of the type where the fuel is injected into the combustion chamber at or near the end of compression, means for mixing and compressing liquid fuel and a gas, a member rotating in fixed relation to the engine, a chamber in said rotating member containing compressed mixture, a second chamber in said rotating member containing mixture under a lower pressure several openings in the walls of said chambers for conducting mixture into and out of said chambers, said openings being disposed in relation to each other to prevent uncompensated pressure of the mixture acting on the rotating member.

65. In internal combustion engines means for putting liquid fuel under pressure, a line for the fuel under pressure, a fuel line leading to the combustion chamber, a rotating member, a chamber in said rotating member, a passage connecting said chamber with said pressure line, a passage connecting said chamber with said fuel line, a second chamber in said rotating member standing under a lower pressure, passages in the wall of said second chamber, and means actuated by a predetermined pressure in the first mentioned chamber for connecting the latter with the second mentioned chamber for compensating the hydrostatic pressure caused by said different passages.

66. In internal combustion engines means for putting liquid fuel under pressure, a line for the fuel under pressure, a member rotating in fixed relation to the engine, a chamber in said rotating member, a connection between said pressure line and said chamber, a line for leading fuel to the combustion chamber periodically, an opening in the wall of said chamber connecting it during part of each revolution with said fuel line, said connecting period varying according to the axial position of said rotating member, and a gear and rack arrangement for adjusting said rotating member axially.

67. In internal combustion engines means for putting liquid fuel under pressure, a chamber containing fuel under pressure, a second chamber containing fuel under a lower pressure than in said first chamber, a line for conducting fuel to the combustion chamber, means for connecting consecutively said pressure line with both said chambers, and means for holding the relation of pressure in both said chambers constant.

68. In internal combustion engines means for putting liquid fuel under high pressure, a chamber containing fuel under high pressure, a second chamber containing fuel under a lower pressure than in said first chamber, a line for connecting fuel to the combustion chamber, means for connecting consecutively said fuel line with both said chambers, and a differential piston arranged between both said chambers for holding the relation of pressure constant in both said chambers.

69. In internal combustion engines means for putting liquid fuel under high pressure, a chamber containing fuel under high pressure, a second chamber containing fuel under a lower pressure than in said first chamber, a fuel line leading fuel to the combustion chamber, means for connecting consecutively said fuel line with both said chambers, a differential piston arranged between both said chambers for holding the relation of pressures constant and means for permitting fuel to pass from the high pressure to the lower pressure side.

70. In internal combustion engines means for putting liquid fuel under high pressure, a chamber containing fuel under high pressure, a second chamber containing fuel under a lower pressure than in said first chamber, a fuel line leading to the combustion chamber, means for connecting consecutively said fuel line with both said chambers, a differential piston between said chambers for controlling the relation of pressures, said differential piston permitting fuel to pass from said high to said lower pressure chamber when the relative pressure in the high pressure chamber becomes too high.

71. In internal combustion engines a chamber containing fuel under high pressure, another chamber containing fuel under a lower pressure, a fuel line leading to the combustion chamber, means for connecting consecutively said fuel line with both said chambers, a differential piston between both said chambers, and passages controlled by said differential piston permitting fluid to pass from the high to the lower pressure side when the relative pressure in the high pressure chamber becomes too high.

72. In internal combustion engines a chamber containing a mixture of liquid fuel and a gas under high pressure, a second chamber containing also a mixture of liquid fuel and a gas but under lower pressure, the pressure in both said chambers controlling in combination the injection of the fuel-gas-mixture into the combustion chamber and a relief valve controlling the absolute height of pressure in both said chambers.

73. In internal combustion engines a chamber containing a mixture of liquid fuel and a gas under high pressure, another chamber containing also a mixture of liquid fuel and a gas, but of lower pressure, the pressures in both said chambers controlling in combination the injection of the fuel-gas-mixture into the combustion chamber, a differential piston between both said pistons keeping constant the relation of the pressures in both said chambers and a relief valve for controlling the absolute pressures in both said chambers.

74. In internal combustion engines, means for mixing and compressing liquid fuel and a gas, means for controlling the amount of compressed mixture injected into the combustion chamber, a tank containing a supply of liquid fuel, and a connection for leading excess mixture into said fuel tank and putting the same under pressure.

75. In internal combustion engines, a pump for mixing and compressing liquid fuel and a gas, a container holding a supply of liquid fuel, a line for delivering fuel from said container to said pump, means for controlling the amount of compressed mixture injected into the combustion chamber, and a connecting line for leading excess mixture into said container, the gas separating from the fuel putting the container under pressure.

76. In internal combustion engines, a pump for mixing and compressing liquid fuel and a gas, a container holding a supply of liquid fuel, a line for conducting fuel from said container to said pump, means for expanding the compressed mixture into the air for the combustion process, and a connecting line for leading excess mixture into said container, the gas separating from the fuel putting the container under pressure and delivering fuel under pressure through said connecting line to said pump.

77. In internal combustion engines a chamber containing a mixture of liquid fuel and a gas under high pressure, another chamber containing also a mixture of liquid fuel and a gas but under a lower pressure, a line for leading mixture to the combustion chamber, means for connecting alternately said line consecutively with both said chambers, a differential piston for regulating the relative pressures in both said chambers, a relief valve for regulating the absolute height of the pressures in said chambers, a container holding a supply of fuel, to be drawn from for mixing with the gas, and a line connecting said relief valve to said fuel container, the excess mixture passing off through said relief valve, placing said fuel container under pressure.

78. In internal combustion engines, a pump for mixing and compressing liquid fuel and a gas, a container holding a supply of liquid fuel, a line for delivering fuel from said container to said pump, means for controlling the amount of compressed mixture injected into the combustion chamber. a connecting line for leading excess mixture into said container, the gas separating from the fuel putting the container under pressure, and a relief valve for controlling the pressure in said container 79. In internal combustion engines a chamber containing liquid fuel under high pressure, another chamber containing also liquid fuel but under a lower pressure, the pressures in both said chambers in combination controlling the injection of liquid fuel into the combustion chamber, a differential piston arranged between both said chambers controlling the relative height of pressure in said chambers, a relief valve mounted in said differential piston, controlling the absolute height of pressure in said chambers, a fuel tank, and a connection between said fuel tank and the space in back of the larger part of said differential piston, said space also connecting to the discharge of said relief valve.

80. In internal combustion engines a chamber containing liquid fuel under high pressure, another chamber containing also liquid fuel but under a lower pressure, means for supplying fuel to said first chamber under high pressure, a by pass permitting fuel to pass from the high to the lower pressure chamber a second by pass permitting fuel to escape from said chamber under lower pressure for controlling the absolute height of pressure in both said chambers and means for connecting the high pressure chamber with the combustion chamber of the engine.

81. In internal combustion engines means for mixing and compressing liquid fuel and a gas, a high pressure chamber, means for periodically supplying said chamber with the mixture, a low pressure chamber, a by pass permitting mixture to pass from the high to the lower pressure chamber for controlling the ratio of pressures in both said chambers, means periodically connecting the high pressure chamber with the combustion chamber of the engine, and a second by pass permitting mixture to pass from said chambers for controlling the absolute pressures in both said chambers.

82. In internal combustion engines means for mixing and compressing liquid fuel and a gas, a rotating member, a rotating member communicating with said means and having outlet ports arranged to be opened and closed for controlling the amount of mixture injected into the combustion chamber, a shaft turning in fixed relation to the engine, said shaft driving said rotating member, and means for turning relatively said rotating member in relation to said driving shaft.

83. In internal combustion engines of the type where the fuel is injected into the combustion chamber at or near the end of compression, means for mixing and compressing liquid fuel and a gas, a chamber for storing an amount of compressed mixture, a second chamber, means including a sleeve valve for timing the period of injection of the mixture into the combustion chamber in relation to the position of the engine piston and for controlling the admission of the mixture to said second chamber, and means for automatically changing this relative timing while the engine is running.

84. In internal combustion engines of the type where the fuel is injected into the combustion chamber at or near the end of compression, means for mixing and compressing liquid fuel and a gas, a chamber for storing a quantity of this mixture, a driving shaft running in fixed relation to the engine, means for controlling the admission of the mixture to said storage chamber, means for timing the period of injection of mixture into the combustion chamber in relation to the movement of the engine piston, a pair of spiral gears interposed between said driving shaft and said turning means, and means for moving one of said spiral gears axially causing thereby a relative change of said timing means to said driving shaft and to the piston of the engine.

85. In internal combustion engines means for mixing and compressing liquid fuel and a gas, a chamber for storing a quantity of the mixture, a second chamber, a rotating member controlling the discharge of the mixture from said storage chamber to said second chamber, timing of the injection of the mixture into the combustion chamber relative to the engine, said rotating member also controlling the quantity of fuel injected, and a governor rotating in fixed relation to the engine, for timing and controlling the injection of mixture into the combustion chamber.

86. In internal combustion engines means for mixing and compressing liquid fuel and a gas, a chamber for storing a quantity of the mixture, a second chamber, a rotating member controlling the discharge of the mixture to said second chamber and the timing of the injection of mixture into the combustion chamber relative to the engine, driving means for said rotating member permitting axial movement of the latter and a governor for controlling the speed of the driving means.

87. In internal combustion engines means for mixing and compressing liquid fuel and a gas, a line for conducting compressed mixture to the combustion chamber, a room for storing a quantity of the compressed mixture, a check valve connecting said store room with said mixture line, permitting mixture to stream only into said store room but not back again, and means for lifting said check valve in order to permit the contents of said store room to expand into said mixture line placing the same under pressure.

88. In internal combustion engines means for mixing and compressing liquid fuel and a gas, a chamber for storing a quantity of the compressed mixture, means for drawing a quantity of mixture from this storage chamber for injection into the combustion chamber, a second storage chamber, a connecting line between both said storage chambers, and a check valve placed in said connecting line permitting mixture only to pass from said first to said second storage chamber, and means for lifting said check valve permitting the stored contents to expand into said first chamber and placing the same under pressure, thus facilitating the starting of the engine after a period of rest, when the pressure in said first storage chamber has gone down.

89. In internal combustion engines where the fuel is injected into the combustion chamber at or near the end of compression, means for placing liquid fuel under pressure, means for controlling the quantity of fuel injected, and a line for connecting the fuel to the combustion chamber, said fuel line constructed with decreasing cross section towards the combustion chamber and including an inlet valve responsive to variations of pressure in the line.

90. In internal combustion engines where the fuel is injected into the combustion chamber at or near the end of compression means for placing liquid fuel under pressure, means for controlling the quantity of fuel injected, and a line for conducting the fuel to the combustion chamber, said line consisting of a plurality of parts with different diameter of the bore, the diameter of the bores decreasing towards the combustion chamber and one of said parts constituting a valve responsive to variations of pressure in the line.

91. In internal combustion engines where the fuel is injected into the combustion chamber at or near the end of compression, means for mixing and compressing liquid fuel and a gas, means for controlling the quantity of mixture injected, and a line for conducting the mixture to the combustion chamber, the free cross section of said mixture line decreasing towards the combustion chamber, said line including an inlet valve for the combustion chamber responsive to a predetermined pressure in the line.

92. In internal combustion engines of the type where the fuel is injected into the combustion chamber at or near the end of compression, means for mixing and compressing liquid fuel and a gas, means for controlling the amount of fuel injected into the combustion chamber, a fuel line for conducting the mixture to the combustion chamber, and a closing valve against the combustion chamber said fuel line conducting the mixture centrally to said closing valve.

93. In internal combustion engines of the type where the fuel is injected into the combustion chamber at or near the end of compression, means for placing fuel under pressure, means for controlling the amount of fuel to be injected, a line for conducting the fuel towards the combustion chamber, a tubular member connected to said fuel line, a valve towards the combustion chamber having a small bore for the passage of the fuel therethrough, said valve opening when the pressure in said fuel line exceeds a certain value, said tubular member extending to said valve in alignment therewith and conducting the fuel centrally to said valve.

94. In internal combustion engines of the type where the fuel is injected into the combustion chamber at or near the end of compression, means for putting fuel under pressure, means for controlling the amount of fuel injected into the combustion chamber, a line for conducting the fuel towards the combustion chamber, a valve closing the fuel line towards the combustion chamber and having a bore extending longitudinally therethrough of smaller diameter than the bore of the line, means for holding normally closed said valve and permitting it to open under a predetermined pressure in the line, and a tubular member connected to said fuel line for conducting the fuel centrally close to said valve, said tubular member also serving as a stop for the lift of said valve.

95. In internal combustion engines of the type where the fuel is injected into the combustion chamber at or near the end of compression, means for putting fuel under pressure, means for controlling the amount of fuel injected into the combustion chamber, a line for conducting the fuel towards the combustion chamber, a valve for closing the fuel line towards the combustion chamber having a longitudinally extending bore therethrough of smaller diameter than the bore of the line, means for holding normally closed said valve and permitting it to open under a predetermined pressure in the line, and means permitting said fuel line to follow partially the movements of said valve without connecting fixedly said valve to said fuel line.

96. In internal combustion engines of the type where the fuel is injected into the combustion chamber at or near the end of compression, means for putting liquid fuel under pressure, means for controlling the amount of fuel injected into the combustion chamber, a line for conducting the fuel towards the combustion chamber, a closing valve against the combustion chamber having a small bore of less diameter than the bore of the line, a tubular member connected to said fuel line in alignment with the valve for conducting the fuel centrally thereto, a spring for holding normally closed said valve, a recess underneath said valve, and a connecting passage from said tubular member to said recess, a predetermined pressure in the line serving to lift the valve and limiting the lift of said valve.

97. In internal combustion engines of the type where the fuel is injected into the combustion chamber at or near the end of compression, a pump for putting liquid fuel under pressure, a tubular line conducting the fuel towards the combustion chamber, a valve closing the fuel line towards the combustion chamber, means for opening periodically said valve, and a second tubular line of larger bore than the outside diameter of said first tubular line, surrounding said first tube and conducting any leakage back to said pump.

98. In internal combustion engines of the type where the fuel is injected into the combustion chamber at or near the end of compression, a pump for mixing and compressing liquid fuel and a gas, a tubular line conducting the mixture towards the combustion chamber, a valve closing the fuel line towards the combustion chamber, means for opening periodically said valve, and a second tubular line, for conducting any leakage back to said pump, said first tubular line arranged inside of said second tubular line.

99. In internal combustion engines of the type where the fuel is injected into the combustion chamber at or near the end of compression, a pump for putting liquid fuel under pressure, a valve on the combustion chamber, means for opening periodically said valve, two tubular lines one inside of the other, one line conducting fuel from said pump to said valve, and the other for conducting any leakage back from said valve to said pump.

100. In internal combustion engines of the type where the fuel is injected into the combustion chamber at or near the end of compression, a pump for putting liquid fuel under pressure, a valve on the combustion chamber, means for opening periodically said valve, two tubular lines one inside of the other connecting said pump and said valve, one for conducting fuel to said valve, the other for leading any leakage back to said pump, and a single fastening means for holding simultaneously both lines in place.

101. The method of forming fuel charges for internal combustion engines of the type wherein the fuel is injected into a charge of air in the combustion chamber at or near the end of the compression period which comprises forming an emulsion of liquid fuel and air or another gas by mixing intimately the fuel with a relatively small quantity of gas comprising the mixture until the fuel forms a considerable portion by volume of the resulting emulsion, compressing air or gas in the combustion chamber and injecting the emulsion into the compressed air of said chamber in which the gas of the emulsion will effectively disrupt the liquid particles of fuel.

102. In internal combustion engines of the type wherein the fuel is injected into a charge of air in the combustion chamber at or near the end of the compression period, a method of forming an emulsion of the liquid fuel and air or another gas by mixing intimately the fuel with a small quantity of gas of less than two per cent of the amount of air required for combustion and compressing the mixture until the fuel forms a considerable portion by volume of the resulting emulsion, the gas of the emulsion upon injection into the combustion chamber serving to effectively expand and disrupt the liquid particles of fuel.

In testimony whereof I hereunto affix my signature.

LORENZ KONRAD BRAREN.